Inventors
Wilhelm A. Andersen
Jan E. Haegh
By Robert R. Benson
Attorney

United States Patent Office 3,016,482
Patented Jan. 9, 1962

3,016,482
TWO SPEED SYNCHRONOUS INDUCTION MOTOR
Wilhelm A. Andersen and Jan E. Haegh, Cincinnati, Ohio, assignors to Allis-Chalmers Manufacturing Company, Milwaukee, Wis.
Filed Jan. 12, 1960, Ser. No. 2,013
5 Claims. (Cl. 318—224)

This application relates generally to synchronous motors. More specifically, this applictaion relates to two speed synchronous motors of the reluctance type.

In the power transmission field there is a great demand for multispeed motors that maintain a very accurate speed. One such motor is described in pending U.S. patent application by Vernon B. Honsinger, entitled, Two Speed Synchronous Motor. This motor operates at two synchronous speeds by merely changing the connections of the stator winding. However, some of the problems encountered in this motor are that it produces a substantially different torque output at the different speeds and may be exceedingly large due to lower efficiencies.

The motor of this invention overcomes the problems of the prior art motor referred to above by providing a two speed synchronous motor that has a commercially acceptable performance and delivers substantially the same torque at both synchronous speeds. This is accomplished by utilizing a novel rotor construction in a synchronous induction motor and providing a specific connection of the stator windings. In this motor, as in the above described motor, the speed can be changed by merely changing the terminal connections on the stator.

Therefore, it is the object of this invention to provide an improved synchronous motor.

Another object of this invention is to provide a new and improved rotor for a synchronous induction motor.

Another object of this invention is to provide a new and improved motor that will operate at two distinct synchronous speeds.

Another object of this invention is to provide a new and improved synchronous induction motor that will accelerate to full speed as an induction motor and will run as a synchronous motor at two different speeds.

Another object of this invention is to provide a new and improved synchronous induction motor that can operate at two different synchronous speeds and produce substantially the same torque output at both synchronous speeds.

Other objects and advantages of this motor will be apparent when reading the following description in conjunction with the accompanying drawings in which.

Figure 1:
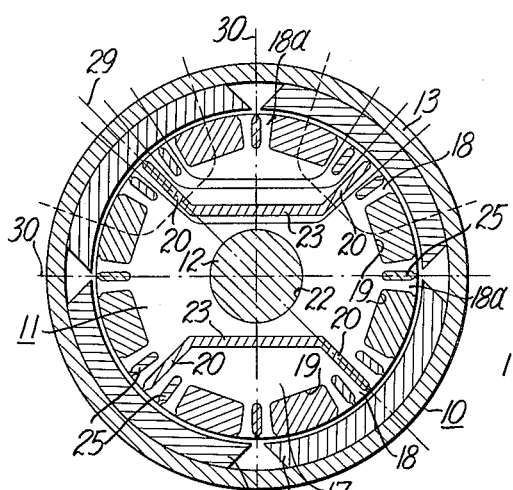
FIG. 1 is a cross sectional view of the preferred embodiment of the motor connected to operate as a four pole synchronous motor.
Figure 2:
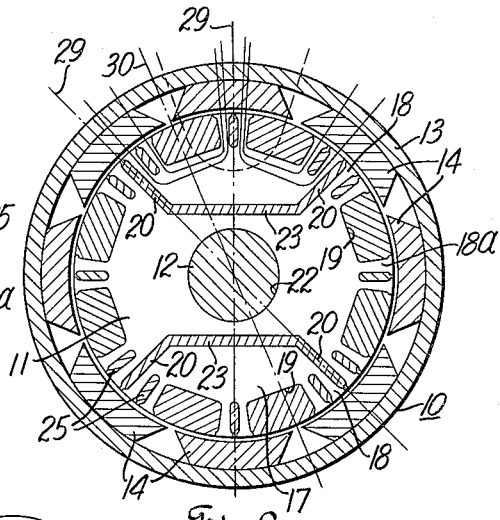
FIG. 2 is a cross sectional view of the preferred embodiment of the motor connected to operate as an eight pole synchronous motor.

As shown in the drawings, the two speed synchronous motor 10 of this invention comprises a cylindrical rotor 11 mounted on a shaft 12 and positioned within a stator 13 for rotation relative thereto. The stator 13 is of the type normally used in single speed induction motors except that the single winding is provided with an extra set of connectors so that the stator may be connected up to selectively provide two sets of rotating poles. The stator and two sets of rotating poles 14 are schematically illustrated in FIGS. 1 and 2 as having four poles (FIG. 1) and eight poles (FIG. 2). In describing the invention the stator will be referred to as having four poles or eight poles for the purpose of illustration but it is obvious to people skilled in the art that the stator could have any even number of poles in one set and twice that number of poles in the second set. In the claims "N" means an even number greater than one.

Figure 4:
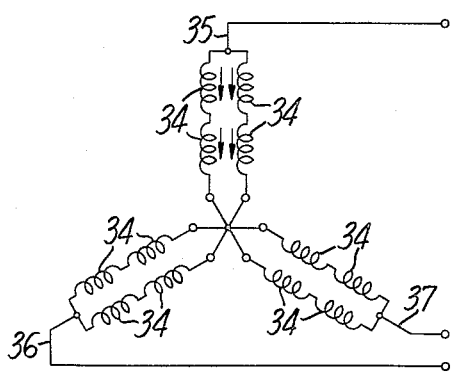
FIG. 4 is a schematic showing of the stator winding connected for four pole operation.
Figure 5:
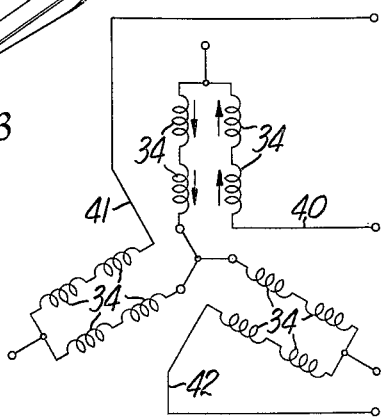
FIG. 5 is a schematic showing of the stator winding connected for eight pole operation.

The stator 13 has a plurality of groups of coils 34 wound in the conventional manner and leads extending therefrom so that they can be connected up to provide either 4 or 8 rotating field poles to enable the motor to operate at two synchronous speeds. FIGS. 4 and 5 will be recognized by those skilled in the art as a connection diagram for a two speed, variable torque, induction motor winding. In the 4 pole operation, as shown in FIG. 4, the leads 35, 36 and 37 are connected to a voltage source so that current in adjacent coil groups 34 on the stator periphery flows in opposite directions. This provides four spaced apart rotating magnetic poles with adjacent poles being of opposite polarity. On the other hand, in the eight pole operation, as shown in FIG. 5, the leads 40, 41 and 42 are connected to a voltage source so that current in adjacent coil groups on the stator periphery flows in the same direction. This provides four spaced apart rotating magnetic poles of the same polarity and the space intermediate the poles takes on the aspects of an opposite pole as a consequence of the flux produced by the current flowing through the groups of coils. The eight pole connection is known as a consequent pole winding. When operating as a four pole machine the stator winding of this motor is connected in a standard arrangement normally used in polyphase induction motors.

In the two speed, single winding, constant torque, induction motor, the stator coils are normally connected in two Y and single delta for four pole and eight pole operation, respectively. When this winding is applied to a two speed synchronous induction motor of the type disclosed herein, the following two results become objectionable:

(1) The flux per pole in four pole operation as compared to the flux per pole in eight pole operation is not sufficient to achieve constant torque at both speeds. To achieve constant torque at both speeds, the flux ratio of four pole operation to eight pole operation must be sufficiently high to overcome the deleterious effect of the secondary poles 18a in the four pole quadrature axis in four pole operation.

(2) The synchronous induction type rotor 11 will create more unbalance in motor reactances than will the normal squirrel cage type induction rotor, and this will produce large circulating currents, consequently high losses, in a delta connected stator winding. The motor would, therefore, have a very low efficiency in eight pole operation.

These undesirable results are both overcome by the use of a type of winding known in this art as a two speed, single winding, consequent pole, variable torque winding in combination with the rotor 11. This winding, a double Y connection for four pole operation and a single Y, consequent pole connection for eight pole operation, provides the desired flux per pole ratio and hence substantially constant torque at both speeds.

The rotor 11 consists of a magnetic core 17 which is preferably laminated. The rotor core 17 has a plurality of salient poles 18, 18a equal to the largest number of poles formed in the stator. The salient poles are separated by axially extending grooves 19 and can be classified as primary poles 18 and secondary poles 18a. The primary poles 18 are those that lock in with the rotating poles on the stator when the motor is operating at either four or eight poles. The secondary poles 18a are those that lock in with the rotating poles on the stator only when the motor is operating as an eight pole machine. The size of the salient poles 18, 18a and the size of the grooves 19 separating adjacent salient poles is determined by the particular performance characteristics desired in the motor. In the motor of this invention, the primary poles 18 have a larger arcuate expanse than the secondary poles 18a.

Figure 3:
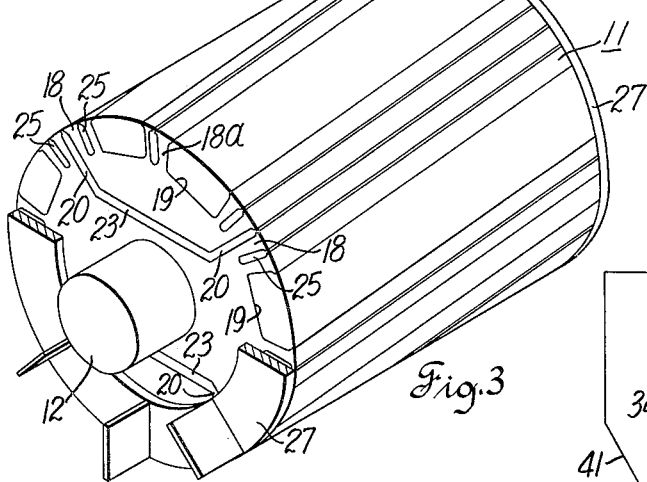
FIG. 3 is a pictorial view of the rotor with parts removed.

In the preferred embodiment as shown in FIGS. 1–3, the primary salient poles 18 are divided by a slot 20 extending from the periphery of the rotor radially inward to near the central bore 22. The radially inner portion of each slot 20 is connected to a slot 20 in an adjacent primary pole by suitable means such as the connecting slot 23. The slots 20 and 23 act as flux barriers to quadrature axis flux.

The poles 18, 18a are also provided with induction motor winding slots 25. Preferably, the slots 20, 23 and 25 and the grooves 19 are filled with a nonmagnetic electrically conducting material and interconnected at the ends of the rotor such as by rings 27 to form a squirrel cage winding. Hence, the motor will have the good starting characteristics of a squirrel cage induction motor. The slots 25 and 20 and the grooves 19 may be skewed as shown in FIG. 3 to improve the induction motor characteristics of the motor. The rotor structure is especially well adapted to being die cast with aluminum.

The secondary poles 18a are similar to the salient poles of a standard reluctance motor. In a synchronous induction motor of the type described herein, the pullout torque is a function of the direct axis reactance and the quadrature axis reactance of the motor. When the stator winding is connected to provide four poles, the direct axis 29 in this motor 10 is aligned with the primary salient poles 18 and the quadrature axis 30 is ninety electrical degrees removed from the direct axis. The pullout torque (PO) is proportional to a constant (K) times the difference between the reciprocal of the quadrature axis reactance $x_q$ and the reciprocal of the direct axis reactance $x_d$ $$PO = K\left(\frac{1}{x_q} - \frac{1}{x_d}\right)$$

To obtain a maximum pullout torque for the motor, the quadrature axis reactance must be reduced to a minimum while maintaining the direct axis reactance near its maximum. The reactance is proportional to the flux. Therefore, to approach a minimum quadrature axis reactance quadrature axis flux must be reduced to a minimum. The quadrature axis flux of a rotor can be reduced by increasing the reluctance in the flux path.

When operating as an eight pole motor such as in FIG. 2, the direct axes 29 pass through the centerline of primary salient poles 18 as well as secondary salient poles 18a and the quadrature axis passes midway between these poles. The motor runs at synchronous speed on a pure reluctance principle. In this arrangement the radial slots 20 and the connecting slots 23 have very little effect on the operation of the motor because they do not oppose the quadrature axis flux and do not substantially interfere with the direct axis flux.

On the other hand, when the motor is operating as a four pole machine such as shown in FIG. 1 the secondary salient poles 18a appear midway between the primary poles and are directly aligned with the quadrature axis 30. This physical structure provides a good magnetic path in the quadrature axis which is contrary to the theory of eliminating quadrature axis flux to improve the torque characteristics of the motor. Therefore, in the rotor 11 the arcuate expanse of the secondary poles is made considerably smaller than the arcuate expanse of the primary pole to reduce the flux in the quadrature axis when the motor is operating as a four pole machine. Furthermore, the radial slots 20 and connecting slots 23 are provided in the primary poles and in the interior of the rotor core 17 to act as flux barriers to the quadrature axis flux. Also, the axially extending grooves 19 on either side of the secondary poles 18a although not ideally located relative to the quadrature axis also provide a flux barrier to the quadrature axis flux. It follows therefore that the width of the radial slots 20 and the connecting slot 23 should be wide enough to substantially eliminate the quadrature axis flux of the motor that bypasses the grooves 19. When operating as a four pole machine the motor is similar in design and operation, except for the secondary poles 18a, to the motor illustrated and described in U.S. Patent 2,733,632, P. F. Bauer and V. B. Honsinger, issued January 31, 1956.

The specific width or arcuate expanse of the grooves 19 is determined by the width or arcuate expanse of the salient poles required for desired motor operation. However, the depth of the grooves 19 is preferably sufficient to substantially minimize the flux throughout the expanse of the groove.

The flux patterns when the motor is operating as a four pole machine are illustrated in FIG. 1 and the flux pattern when the motor is operating as an eight pole machine is shown in FIG. 2. The direct axis or useful flux is shown in solid lines and the quadrature axis flux is shown in broken lines. It can be seen from these figures that when the motor is operating as a four pole machine the axially extending grooves 19 and the slots 20, 23 all act as useful flux barriers whereas when operating as en eight pole machine only the grooves 19 are useful flux barriers.

Although but one embodiment has been illustrated and described, it will be apparent to those skilled in the art that various changes and modifications may be made therein without departing from the spirit of the invention or from the scope of the appended claims.

Having now particularly described and ascertained the nature of our said invention and the manner in which it is to be performed, we declare that what we claim is:

1. A rotor for a synchronous induction motor comprising: a core having a plurality of arcuately spaced salient poles separated by axially extending grooves, said poles having winding slots near their periphery, alternate poles having at least one dividing slot extending radially inward from the periphery of said core, said alternate salient poles having a larger arcuate expanse than the other salient poles, the radially inner end of each of said dividing slots being connected to the radially inner end of a dividing slot in an adjacent pole, said slots and grooves being filled with a nonmagnetic electrically conducting material and interconnected at the ends of the core to form a squirrel cage winding.

2. A motor comprising: a stator, means for selectively providing said stator with two different sets of rotating field poles, a rotor positioned within said stator, said rotor having a plurality of arcuately spaced salient poles separated by axially extending grooves, said poles having winding slots near their periphery, alternate poles having at least one dividing slot extending radially inward from the periphery of said rotor, said alternate salient poles having a larger arcuate expanse than the other salient poles, the radially inner end of each of said dividing slots being connected to the radially inner end of a dividing slot in an adjacent pole, said slots and grooves being filled with a nonmagnetic electrically conducting material and interconnected at the ends of the rotor to form a squirrel cage winding.

3. A motor comprising: a stator having a three phase winding, said winding being connected in double Y to provide N rotating field poles in said stator and in single Y, consequent pole to provide 2N rotating field poles, a rotor positioned within said stator and mounted on a shaft for rotation therewith, said rotor having a plurality of arcuately spaced salient poles separated by axially extending grooves, said poles having winding slots near their periphery, alternate poles having at least one dividing slot extending radially inward from the periphery of said rotor, said alternate salient poles having a larger arcuate expanse than the other salient poles, the radially inner end of each of said dividing slots being connected to the radially inner end of a dividing slot in an adjacent pole, said slots and grooves being filled with a nonmagnetic electrically conducting material and interconnected at the ends of the rotor to form a squirrel cage winding.

4. A motor comprising: a stator, means for selectively providing said stator with two different sets of rotating field poles, a rotor positioned within said stator, said rotor having a plurality of arcuately spaced salient poles separated by axially extending grooves, alternate salient poles having a larger arcuate expanse than the other salient poles, said grooves being filled with a nonmagnetic, electrically conducting material and interconnected at the ends of the rotor to form a squirrel cage winding.

5. A motor comprising: a stator, means for selectively providing said stator with two different sets of rotating field poles, a rotor positioned within said stator, said rotor having a plurality of arcuately spaced salient poles separated by axially extending grooves, said poles having winding slots near their periphery, alternate salient poles having a larger arcuate expanse than the other salient poles, said poles having winding slots near their periphery, said slots and grooves being filled with a nonmagnetic electrically conducting material and interconnected at the ends of the rotor to form a squirrel cage winding.

References Cited in the file of this patent

UNITED STATES PATENTS

| | | |
|---|---|---|
| 2,733,362 | Bauer et al. | Jan. 31, 1956 |
| 2,769,108 | Risch | Oct. 30, 1956 |
| 2,913,607 | Douglas et al. | Nov. 17, 1959 |